United States Patent
Fan et al.

(10) Patent No.: US 12,516,354 B2
(45) Date of Patent: *Jan. 6, 2026

(54) HYBRID YEAST WITH INCREASED ETHANOL PRODUCTION

(71) Applicant: DANISCO US INC., Palo Alto, CA (US)

(72) Inventors: Xiaochun Fan, West Chester, PA (US); Kerry Hollands, Newark, NJ (US); Barbara Urszula Kozak, Utrecht (NL); Elizabeth A. Krasley, Wilmington, DE (US); Celia Emily Gaby Payen, Wilmington, DE (US); Min Qi, Hockessin, DE (US)

(73) Assignee: DANISCO US INC., Palo Alto, CA (US)

( * ) Notice: Subject to any disclaimer, the term of this patent is extended or adjusted under 35 U.S.C. 154(b) by 347 days.

This patent is subject to a terminal disclaimer.

(21) Appl. No.: 17/418,023

(22) PCT Filed: Jan. 7, 2020

(86) PCT No.: PCT/US2020/012545
§ 371 (c)(1),
(2) Date: Jun. 24, 2021

(87) PCT Pub. No.: WO2020/146357
PCT Pub. Date: Jul. 16, 2020

(65) Prior Publication Data
US 2022/0073954 A1    Mar. 10, 2022

Related U.S. Application Data

(60) Provisional application No. 62/789,873, filed on Jan. 8, 2019.

(51) Int. Cl.
| | | |
|---|---|---|
| *C12N 1/18* | (2006.01) | |
| *C12P 7/06* | (2006.01) | |
| *C12R 1/865* | (2006.01) | |

(52) U.S. Cl.
CPC ............ *C12P 7/06* (2013.01); *C12N 1/185* (2021.05); *C12R 2001/865* (2021.05)

(58) Field of Classification Search
CPC ..... C12P 7/06; C12N 1/185; C12R 2001/865; Y02E 50/10
See application file for complete search history.

(56) References Cited

U.S. PATENT DOCUMENTS

| | | |
|---|---|---|
| 8,795,998 B2 | 8/2014 | Pronk et al. |
| 8,956,851 B2 | 2/2015 | Argyros et al. |
| 9,175,270 B2 | 11/2015 | Nevoigt et al. |

FOREIGN PATENT DOCUMENTS

| | | | |
|---|---|---|---|
| WO | 2015023989 A1 | 2/2015 | |
| WO | WO 2015148272 A1 * | 10/2015 | ............... C12N 9/88 |
| WO | 2018089333 A1 | 5/2018 | |
| WO | 2018226573 A1 | 12/2018 | |

OTHER PUBLICATIONS

International Search Report from PCT Application No. PCT/US2020/012545 dated Jul. 2, 2020, 11 pages.
Altschul et al., "Basic Local Alignment Search Tool", J. Mol. Biol., vol. 215, 1990, pp. 403-410.
Altschul et al., "Local Alignment Statistics", Meth. Enzymol., vol. 266, 1996, pp. 460-480.
Devereux et al., "A comprehensive set of sequence analysis programs for the VAX", Nucleic Acids Res., vol. 12, 1984, pp. 387-395.
Duskova et al., "Two glycerol uptake systems contribute to the high osmotolerance of Zygosaccharomyces rouxii", Mol Microbial., vol. 97, No. 3, 2015, pp. 541-559.
Feng et al., "Progressive Sequence Alignment as a Prerequisite to Correct Phylogenetic Trees", J. Mol. Evol., vol. 35, 1987, pp. 351-360.
Ferreira et al., "A Member of the Sugar Transporter Family, Stl1p Is the Glycerol/H Symporter in *Saccharomyces cerevisiae*" Mol. Biol. Cell, vol. 16, 2005, pp. 2068-2076.
Figueiredo et al., "New Lager Brewery Strains Obtained by Crossing Techniques Using Cachaça (Brazilian Spirit) Yeasts", Applied and Environmental Microbiology, vol. 83, No. 20, Sep. 29, 2017, 17 pages.
Gombert et al., "Improving conversion yield of fermentable sugars into fuel ethanol in 1st generation yeast-based production processes", Curr. Opin. Biotechnol., vol. 33, 2015, pp. 81-86.
Henikoff et al., "Amino acid substitution matrices from protein blocks", Proc. Natl. Acad. Sci. USA, vol. 89, 1989, pp. 10915-10919.
Higgins et al., "Fast and sensitive multiple sequence alignments on a microcomputer", CABIOS, vol. 5, 1989, pp. 151-153.
Karlin et al., "Applications and statistics for multiple high-scoring segments in molecular sequences", Proc. Natl. Acad. Sci. USA, vol. 90, 1993, pp. 5873-5887.
Needleman et al., "A General Method Applicable to the Search for Similarities in the Amino Acid Sequence of Two Proteins", J. Mol. Biol. vol. 48, 1970, pp. 443-453.
Pearson et al., "Improved tools for biological sequence comparison", Proc. Natl. Acad. Sci. USA, vol. 85, Apr. 1988, pp. 2444-2448.
Peterson, "Multiple SWItches to turn on chromatin?", Curr. Opin. Genet. Dev. 6, 2015, pp. 171-175.
Snoek et al., "Large-scale robot-assisted genome shuffling yields industrial *Saccharomyces cerevisiae* yeasts with increased ethanol tolerance", Biotechnology for Biofuels, vol. 8, No. 1, Feb. 26, 2015, 19 pages.

(Continued)

*Primary Examiner* — Satyendra K Singh

(57) ABSTRACT

Described are compositions and methods related to hybrid yeast that produces an increased amount of ethanol from starch-containing substrates compared to its parental yeast. Such yeast is well-suited for use in fuel alcohol production to increase yield.

12 Claims, No Drawings

Specification includes a Sequence Listing.

(56) References Cited

OTHER PUBLICATIONS

Thompson et al., "CLUSTAL W: improving the sensitivity of progressive multiple sequence alignment through sequence weighting, position-specific gap penalties and weight matrix choice", Nucleic Acids Res., vol. 22, 1994, pp. 4673-4680.

Winston et al., "Yeast SNF/SWI transactional activators and the SPT/SIN chromatin connection", Trends in Genetics, vol. 8, Issue 11, Nov. 1992, pp. 387-391.

\* cited by examiner

```
                         SEQUENCE LISTING

<160> NUMBER OF SEQ ID NOS: 2

<210> SEQ ID NO 1
<211> LENGTH: 167
<212> TYPE: PRT
<213> ORGANISM: Saccharomyces cerevisiae

<400> SEQUENCE: 1

Met Asn Asn Glu Thr Ser Gly Lys Glu Thr Ala Ser Ala Pro Leu Cys
1               5                   10                  15

Ser Pro Lys Leu Pro Val Glu Lys Val Gln Arg Ile Ala Lys Asn Asp
                20                  25                  30

Pro Glu Tyr Met Asp Thr Ser Asp Asp Ala Phe Val Ala Thr Ala Phe
            35                  40                  45

Ala Thr Glu Phe Phe Val Gln Val Leu Thr His Glu Ser Leu His Arg
    50                  55                  60

Gln Gln Gln Gln Gln Gln Gln Val Pro Pro Leu Pro Asp Glu Leu
65                  70                  75                  80

Thr Leu Ser Tyr Asp Asp Ile Ser Ala Ala Ile Val His Ser Ser Asp
                85                  90                  95

Gly His Leu Gln Phe Leu Asn Asp Val Ile Pro Thr Thr Lys Asn Leu
            100                 105                 110

Arg Leu Leu Val Glu Glu Asn Arg Val Arg Tyr Thr Thr Ser Val Met
        115                 120                 125

Pro Pro Asn Glu Val Tyr Ser Ala Tyr Val Val Asn Asp Thr Ala Pro
130                 135                 140

Lys Pro Asn Ile Val Glu Ile Asp Leu Asp Asn Asp Glu Asp Asp
145                 150                 155                 160

Glu Asp Val Thr Asp Gln Glu
                165

<210> SEQ ID NO 2
<211> LENGTH: 503
<212> TYPE: DNA
<213> ORGANISM: Saccharomyces cerevisiae

<400> SEQUENCE: 2
atgaacaacg agactagtgg taaagaaacg gcgtctgcac ctctgtgttc gcccaagtta      60
cctgtagaaa aagtgcagag aatagccaag aatgatccaa aatatatgga cacttcggat     120
gacgcattcg tagccacagc gtttgctaca gaattcttcg tccaggtgct gacacatgag     180
tccctacata ggcaacagca gcagcaacaa caacaggtac cgccgctccc agatgaactc     240
acgctgtcgt acgatgacat ctctgccgca attgtgcact cttctgacgg ccatctgcag     300
ttttgaatga tgtgatacca acaacaaaga atttgaggct tctagtggaa gaaaaccgag     360
ttagatatac tacaagtgtc atgccccta atgaagttta ctccgcctat gtggtgaacg      420
atacggctcc gaagcccaac attgtcgaga ttgatcttga taatgacgaa gacgacgacg     480
aagacgttac tgatcaagaa taa                                             503
```

HYBRID YEAST WITH INCREASED ETHANOL PRODUCTION

CROSS REFERENCE TO RELATED APPLICATIONS

The present application claims priority to U.S. Provisional Application No. 62/789,873, filed on Jan. 8, 2019, and is hereby incorporated by reference in its entirety.

INCORPORATION BY REFERENCE OF THE SEQUENCE LISTING

The present application is being filed with a Sequence Listing in electronic format. The Sequence Listing is provided as a file entitled NB41509USPCT_SequenceListing_ST25.txt, created on Jun. 28, 2024, which is 2,637 bytes in size. The information in the electronic format of the Sequence Listing is incorporated by reference in its entirety.

TECHNICAL FIELD

The present compositions and methods relate to hybrid yeast that produce an increased amount of ethanol from starch-containing substrates compared to its parental yeast. Such yeast is well-suited for use in fuel alcohol production to increase yield.

BACKGROUND

First-generation yeast-based ethanol production converts sugars into fuel ethanol. The annual fuel ethanol production by yeast is about 90 billion liters worldwide (Gombert, A. K. and van Maris. A. J. (2015) Curr. Opin. Biotechnol. 33:81-86). It is estimated that about 70% of the cost of ethanol production is the feedstock. Since the production volume is so large, even small yield improvements have massive economic impact across the industry.

Engineered yeast that produce more ethanol than their wild-type parents, and even artificially evolved yeast, are commercially available. However, all forms of engineering involve compromise and metabolic engineering of yeast is no exception. Engineered yeast typically has undesirable properties such as a slow growth rate, reduced robustness, inability to grow in the presence of high dissolved solids (DS), and increased production of undesirable byproducts.

The need exists for yeast that produce more alcohol, grow quickly in the presence of high DS and grow at elevated temperatures.

SUMMARY

Described are compositions and methods relating to hybrid yeast cells that produce an increased amount of ethanol from starch-containing substrates compared to their parental yeast. Aspects and embodiments of the modified yeast cells and methods are described in the following, independently-numbered paragraphs.

1. In one aspect, a yeast strain is provided, that is *Saccharomyces cerevisiae* strain DGY1 (deposited under Accession No. V18/015412 at National Measurement Institute, Victoria, Australia); or a derivative, thereof, having defining characteristics of yeast strain *S. cerevisiae* strain DGY1.
2. In some embodiments, the yeast strain of paragraph 1 further comprising a genetic alteration that causes the cells of the strain to produce a decreased amount of functional Dls1 polypeptide.
3. In some embodiments of the yeast strain of paragraph 1 or 2, the cells of the strain comprise an exogenous gene encoding a carbohydrate processing enzyme.
4. In some embodiments of the yeast strain of paragraph 3, the exogenous gene encoding a carbohydrate processing enzyme encodes a glucoamylase.
5. In some embodiments of the yeast strain of any of paragraphs 1-4, the cells of the strain comprise an alteration in the glycerol pathway and/or the acetyl-CoA pathway.
6. In some embodiments of the yeast strain of any of paragraphs 1-5, the cells of the strain comprise an alternative pathway for making ethanol.
7. In another aspect, a process for producing ethanol from a starch-containing material is provided, comprising: (a) sacchariflying the starch-containing material to obtain glucose; and (b) fermenting the glucose to produce ethanol using a fermentation organism; wherein the fermentation organism is the *Saccharomyces cerevisiae* strain DGY1 (deposited under Accession No. V18/015412 at National Measurement Institute, Victoria, Australia); or a derivative, thereof, having defining characteristics of *S. cerevisiae* strain DGY1.
8. In some embodiments of the process of paragraph 7, the yeast strain produces an increased amount of alcohol compared to the parental strains under equivalent fermentation conditions.
9. In some embodiments of the process of paragraph 7 or 8, the cells of the yeast strain further comprise a genetic alteration that causes the cells of the strain to produce a decreased amount of functional Dls1 polypeptide.
10. In some embodiments of the process of any of paragraphs 7-9, the cells of the yeast strain further comprise an exogenous gene encoding a carbohydrate processing enzyme.
11. In some embodiments of the process of paragraph 10, the exogenous gene encoding a carbohydrate processing enzyme encodes a glucoamylase.
12. In some embodiments of the process of any of paragraphs 7-11, the cells of the strain comprise an alteration in the glycerol pathway and/or the acetyl-CoA pathway.
13. In some embodiments of the process of any of paragraphs 7-12, the cells of the strain comprise an alternative pathway for making ethanol.

These and other aspects and embodiments of present compositions and methods will be apparent from the description.

DETAILED DESCRIPTION

I. Overview

The present compositions and methods relate to hybrid yeast cells that produce an increased amount of ethanol from starch-containing substrates compared to their parental cells under the same fermentation conditions. Aspect and embodiments of the composition and methods are described in detail, below.

II. Definitions

Prior to describing the modified yeast cells and methods of use in detail, the following terms are defined for clarity. Terms not defined should be accorded their ordinary meanings as used in the relevant art.

As used herein, "alcohol" refer to an organic compound in which a hydroxyl functional group (—OH) is bound to a saturated carbon atom.

As used herein, the terms "yeast cells," "yeast strains" or simply "yeast" refer to organisms from the phyla Ascomycota and Basidiomycota. Exemplary yeast is budding yeast from the order Saccharomycesles. Particular examples of yeast are *Saccharomyces* spp., including but not limited to *S. cerevisiae*. Yeast include organisms used for the production of fuel alcohol as well as organisms used for the production of potable alcohol, including specialty and proprietary yeast strains used to make distinctive-tasting beers, wines, and other fermented beverages.

As used herein, the phrase "variant yeast cells," "modified yeast cells," or similar phrases (see above), refer to yeast that include genetic modifications and characteristics described herein. Variant/modified yeast do not include naturally occurring yeast.

As used herein, the phrase "substantially free of an activity," or similar phrases, means that a specified activity is either undetectable in an admixture or present in an amount that would not interfere with the intended purpose of the admixture.

As used herein, the terms "polypeptide" and "protein" (and their respective plural forms) are used interchangeably to refer to polymers of any length comprising amino acid residues linked by peptide bonds. The conventional one-letter or three-letter codes for amino acid residues are used herein and all sequence are presented from an N-terminal to C-terminal direction. The polymer can be linear or branched, it can comprise modified amino acids, and it can be interrupted by non-amino acids. The terms also encompass an amino acid polymer that has been modified naturally or by intervention; for example, disulfide bond formation, glycosylation, lipidation, acetylation, phosphorylation, or any other manipulation or modification, such as conjugation with a labeling component. Also included within the definition are, for example, polypeptides containing one or more analogs of an amino acid (including, for example, unnatural amino acids, etc.), as well as other modifications known in the art.

As used herein, functionally and/or structurally similar proteins are considered to be "related proteins." Such proteins can be derived from organisms of different genera and/or species, or even different classes of organisms (e.g., bacteria and fungi). Related proteins also encompass homologs determined by primary sequence analysis, determined by secondary or tertiary structure analysis, or determined by immunological cross-reactivity.

As used herein, the term "homologous protein" or "homolog" refers to a protein that has similar activity and/or structure to a reference protein. It is not intended that homologs necessarily be evolutionarily related. Thus, it is intended that the term encompass the same, similar, or corresponding enzyme(s) (i.e., in terms of structure and function) obtained from different organisms. In some embodiments, it is desirable to identify a homolog that has a quaternary, tertiary and/or primary structure similar to the reference protein. In some embodiments, homologous proteins induce similar immunological response(s) as a reference protein. In some embodiments, homologous proteins are engineered to produce enzymes with desired activity (ies).

The degree of homology between sequences can be determined using any suitable method known in the art (see, e.g., Smith and Waterman (1981) *Adv. Appl. Math.* 2:482; Needleman and Wunsch (1970) *J. Mol. Biol.*, 48:443; Pearson and Lipman (1988) *Proc. Natl. Acad. Sci. USA* 85:2444; programs such as GAP, BESTFIT, FASTA, and TFASTA in the Wisconsin Genetics Software Package (Genetics Computer Group, Madison, WI); and Devereux et al. (1984) *Nuc. Acids Res.* 12:387-95).

For example, PILEUP is a useful program to determine sequence homology levels. PILEUP creates a multiple sequence alignment from a group of related sequences using progressive, pair-wise alignments. It can also plot a tree showing the clustering relationships used to create the alignment. PILEUP uses a simplification of the progressive alignment method of Feng and Doolittle, (Feng and Doolittle (1987) *J. Mol. Evol.* 35:351-60). The method is similar to that described by Higgins and Sharp ((1989) *CABIOS* 5:151-53). Useful PILEUP parameters including a default gap weight of 3.00, a default gap length weight of 0.10, and weighted end gaps. Another example of a useful algorithm is the BLAST algorithm, described by Altschul et al. ((1990) *J. Mol. Biol.* 215:403-10) and Karlin et al. ((1993) *Proc. Natl. Acad. Sci. USA* 90:5873-87). One particularly useful BLAST program is the WU-BLAST-2 program (see, e.g., Altschul et al. (1996) *Meth. Enzymol.* 266:460-80). Parameters "W," "T" and "X" determine the sensitivity and speed of the alignment. The BLAST program uses as defaults a word-length (W) of 11, the BLOSUM62 scoring matrix (see, e.g., Henikoff and Henikoff (1989) *Proc. Natl. Acad. Sci. USA* 89:10915) alignments (B) of 50, expectation (E) of 10, M'5, N'-4, and a comparison of both strands.

As used herein, the phrases "substantially similar" and "substantially identical," in the context of at least two nucleic acids or polypeptides, typically means that a polynucleotide or polypeptide comprises a sequence that has at least about 70% identity, at least about 75% identity, at least about 80% identity, at least about 85% identity, at least about 90% identity, at least about 91% identity, at least about 92% identity, at least about 93% identity, at least about 94% identity, at least about 95% identity, at least about 96% identity, at least about 97% identity, at least about 98% identity, or even at least about 99% identity, or more, compared to the reference (i.e., wild-type) sequence. Percent sequence identity is calculated using CLUSTAL W algorithm with default parameters. See Thompson et al. (1994) *Nucleic Acids Res.* 22:4673-4680. Default parameters for the CLUSTAL W algorithm are:

Gap opening penalty: 10.0
Gap extension penalty: 0.05
Protein weight matrix: BLOSUM series
DNA weight matrix: IUB
Delay divergent sequences %: 40
Gap separation distance: 8
DNA transitions weight: 0.50
List hydrophilic residues: GPSNDQEKR
Use negative matrix: OFF
Toggle Residue specific penalties: ON
Toggle hydrophilic penalties: ON
Toggle end gap separation penalty OFF Another indication that two polypeptides are substantially identical is that the first polypeptide is immunologically cross-reactive with the second polypeptide. Typically, polypeptides that differ by conservative amino acid substitutions are immunologically cross-reactive. Thus, a polypeptide is substantially identical to a second polypeptide, for example, where the two peptides differ only by a conservative substitution. Another indication that two nucleic acid sequences are substantially identical is that the two molecules hybridize to each other under stringent conditions (e.g., within a range of medium to high stringency).

As used herein, the term "gene" is synonymous with the term "allele" in referring to a nucleic acid that encodes and directs the expression of a protein or RNA. Vegetative forms of filamentous fungi are generally haploid, therefore a single copy of a specified gene (i.e., a single allele) is sufficient to confer a specified phenotype.

As used herein, "expressing a polypeptide" and similar terms, refer to the cellular process of producing a polypeptide using the translation machinery (e.g., ribosomes) of the cell.

As used herein, "overexpressing a polypeptide," "increasing the expression of a polypeptide," and similar terms, refer to expressing a polypeptide at higher-than-normal levels compared to those observed with parental or "wild-type cells that do not include a specified genetic modification.

As used herein, an "expression cassette" refers to a nucleic acid that includes an amino acid coding sequence, promoters, terminators, and other nucleic acid sequence needed to allow the encoded polypeptide to be produced in a cell. Expression cassettes can be exogenous (i.e., introduced into a cell) or endogenous (i.e., extant in a cell).

As used herein, the terms "wild-type" and "native" are used interchangeably and refer to genes proteins or strains found in nature.

As used herein, the term "protein of interest" refers to a polypeptide that is desired to be expressed in modified yeast. Such a protein can be an enzyme, a substrate-binding protein, a surface-active protein, a structural protein, a selectable marker, or the like, and can be expressed at high levels. The protein of interest is encoded by a modified endogenous gene or a heterologous gene (i.e., gene of interest") relative to the parental strain. The protein of interest can be expressed intracellularly or as a secreted protein.

As used herein, "deletion of a gene," refers to its removal from the genome of a host cell. Where a gene includes control elements (e.g., enhancer elements) that are not located immediately adjacent to the coding sequence of a gene, deletion of a gene refers to the deletion of the coding sequence, and optionally adjacent enhancer elements, including but not limited to, for example, promoter and/or terminator sequences, but does not require the deletion of non-adjacent control elements.

As used herein, "disruption of a gene" refers broadly to any genetic or chemical manipulation, i.e., mutation, that substantially prevents a cell from producing a function gene product, e.g., a protein, in a host cell. Exemplary methods of disruption include complete or partial deletion of any portion of a gene, including a polypeptide-coding sequence, a promoter, an enhancer, or another regulatory element, or mutagenesis of the same, where mutagenesis encompasses substitutions, insertions, deletions, inversions, and combinations and variations, thereof, any of which mutations substantially prevent the production of a function gene product. A gene can also be disrupted using RNAi, antisense, or any other method that abolishes gene expression. A gene can be disrupted by deletion or genetic manipulation of non-adjacent control elements.

As used herein, the terms "genetic manipulation" and "genetic alteration" are used interchangeably and refer to the alteration/change of a nucleic acid sequence. The alteration can include but is not limited to a substitution, deletion, insertion or chemical modification of at least one nucleic acid in the nucleic acid sequence.

As used herein, a "functional polypeptide/protein" is a protein that possesses an activity, such as an enzymatic activity, a binding activity, a surface-active property, or the like, and which has not been mutagenized, truncated, or otherwise-modified to abolish or reduce that activity. Functional polypeptides can be thermostable or thermolabile, as specified.

As used herein, "a functional gene" is a gene capable of being used by cellular components to produce an active gene product, typically a protein. Functional genes are the antithesis of disrupted genes, which are modified such that they cannot be used by cellular components to produce an active gene product, or have a reduced ability to be used by cellular components to produce an active gene product.

As used herein, yeast cells have been "modified to prevent the production of a specified protein" if they have been genetically or chemically altered to prevent the production of a functional protein/polypeptide that exhibits an activity characteristic of the wild-type protein. Such modifications include, but are not limited to, deletion or disruption of the gene encoding the protein (as described, herein), modification of the gene such that the encoded polypeptide lacks the aforementioned activity, modification of the gene to affect post-translational processing or stability, and combinations, thereof.

As used herein, the term "paralog" refers to homologous genes that are the result of a duplication event.

As used herein, "attenuation of a pathway" or "attenuation of the flux through a pathway" i.e., a biochemical pathway, refers broadly to any genetic or chemical manipulation that reduces or completely stops the flux of biochemical substrates or intermediates through a metabolic pathway. Attenuation of a pathway may be achieved by a variety of well-known methods. Such methods include but are not limited to: complete or partial deletion of one or more genes, replacing wild-type alleles of these genes with mutant forms encoding enzymes with reduced catalytic activity or increased Km values, modifying the promoters or other regulatory elements that control the expression of one or more genes, engineering the enzymes or the mRNA encoding these enzymes for a decreased stability, misdirecting enzymes to cellular compartments where they are less likely to interact with substrate and intermediates, the use of interfering RNA, and the like.

As used herein, "aerobic fermentation" refers to growth in the presence of oxygen.

As used herein, "anaerobic fermentation" refers to growth in the absence of oxygen.

As used herein, the singular articles "a," "an," and "the" encompass the plural referents unless the context clearly dictates otherwise. All references cited herein are hereby incorporated by reference in their entirety. The following abbreviations/acronyms have the following meanings unless otherwise specified:

° C. degrees Centigrade
AA α-amylase
bp base pairs
DNA deoxyribonucleic acid
DP degree of polymerization
ds or DS dry solids
EtOH ethanol
g or gm gram
g/L grams per liter
GA glucoamylase
GAU/g ds glucoamylase units per gram dry solids
$H_2O$ water
HPLC high performance liquid chromatography hr or h hour
kg kilogram
M molar
mg milligram
mL or ml milliliter
ml/min milliliter per minute
mM millimolar
N normal
nm nanometer
PCR polymerase chain reaction
ppm parts per million
RNA ribonucleic acid
Δ relating to a deletion
μg microgram
μL and μl microliter
μM micromolar III. Hybrid Yeast Producing Increased Ethanol from a Starch Substrate Described are hybrid yeast that produces an increased amount of ethanol from starch-containing substrates. Numerous genetically-modified yeast has been described that produce an increased amount of ethanol compared to their parental yeast. Increased ethanol production is often achieved by the introduction of heterologous metabolic pathways that channel carbon toward ethanol production. Unfortunately, such yeast often produces increased amounts of toxic by-products, such as acetate, formate, fusel alcohols, and the like. Such by-products can be particularly toxic when combined with other stress factors, such as elevated temperatures and low pH fermentation conditions.

While metabolic pathway engineering is capable of producing yeast cells having myriad advantageous properties, holistic modifications to metabolic flux and redox rebalance is complicated. Applicants have, therefore, used advanced high-throughput forms of yeast mating and phenotypic selection to generate yeast that demonstrate increased ethanol production while having a minimum of undesirable characteristics.

Two commercially-available parental yeast strains were used for mating. The mating and selection for resulting hybrid yeast cells that produced an increased amount of ethanol resulted in a yeast strain designated *Saccharomyces cerevisiae* strain DGY1, which is deposited under Accession No. V18/015412 at the National Measurement Institute in Victoria, Australia, located at 1/153 Bertie Street, Port Melbourne, Victoria, Australia, 3207, and was deposited on Aug. 7, 2018, and has the Brazilian SISGEN Registry No. A9D1003. While analysis is underway to determine the genotype of the hybrid strain, *S. cerevisiae* strain DGY1 already represents a robust yeast strain for improved ethanol production, particularly at elevated fermentation temperatures and lower pH conditions.

In some embodiments, the increase in the amount of ethanol produced by the hybrid yeast cells is an increase of at least 2.0%, at least 2.5%, at least 3.0%, at least 3.5%, at least 4.0%, at least 4.5%, at least 5.0%, at least 5.5%, or even at least 6.0%, or higher, compared to the amount of ethanol produced by either parental yeast cells grown under the same conditions.

IV. Hybrid Yeast Cells Having Reduced Dls1 Expression

Dls1, encoded by the gene YJL065c, is a 167-amino acid polypeptide subunit of the ISW2 yeast chromatin accessibility complex (yCHRAC), which contains Isw2, Itc1, Dpb3-like subunit (Dls1), and Dpb4 (see, e.g., Peterson, C. L. (1996) *Curr. Opin. Genet. Dev.* 6:171-75 and Winston, F. and Carlson, M. (1992) *Trends Genet.* 8:387-91). The current researchers and their colleagues have previously determined that in the absence of other genetic modifications, yeast having a genetic alteration that reduces the amount of functional Dls1 in the cells exhibit increased robustness during fermentation, allowing higher-temperature, and potentially shorter, fermentations (data not shown).

Reduction in the amount of functional Dls1 produced in a cell can be accomplished by disruption of the YJL065c gene. Disruption of the YJL065c gene can be performed using any suitable methods that substantially prevent expression of a function YJL065c gene product, i.e., Dls1. Exemplary methods of disruption as are known to one of skill in the art include but are not limited to: complete or partial deletion of the YJL065c gene, including complete or partial deletion of, e.g., the Dls1-coding sequence, the promoter, the terminator, an enhancer, or another regulatory element; and complete or partial deletion of a portion of the chromosome that includes any portion of the YJL065c gene. Particular methods of disrupting the YJL065c gene include making nucleotide substitutions or insertions in any portion of the YJL065c gene, e.g., the Dls1-coding sequence, the promoter, the terminator, an enhancer, or another regulatory element. Preferably, deletions, insertions, and/or substitutions (collectively referred to as mutations) are made by genetic manipulation using sequence-specific molecular biology techniques, as opposed to by chemical mutagenesis, which is generally not targeted to specific nucleic acid sequences. Nonetheless, chemical mutagenesis can, in theory, be used to disrupt the YJL065c gene.

Mutations in the YJL065c gene can reduce the efficiency of the YJL065c promoter, reduce the efficiency of a YJL065c enhancer, interfere with the splicing or editing of the YJL065c mRNA, interfere with the translation of the YJL065c mRNA, introduce a stop codon into the YJL065c-coding sequence to prevent the translation of full-length tYJL065c protein, change the coding sequence of the Dls1 protein to produce a less active or inactive protein or reduce Dls1 interaction with other nuclear protein components, or DNA, change the coding sequence of the Dls1 protein to produce a less stable protein or target the protein for destruction, cause the Dls1 protein to misfold or be incorrectly modified (e.g., by glycosylation), or interfere with cellular trafficking of the Dls1 protein. In some embodiments, these and other genetic manipulations act to reduce or prevent the expression of a functional Dls1 protein, or reduce or prevent the normal biological activity of Dls1.

In some embodiments, the present hybrid yeast cells include genetic manipulations that reduce or prevent the expression of a functional Dls1 protein, or reduce or prevent the normal biological activity of Dls1, as well as additional mutations that reduce or prevent the expression of a functional Isw2, Itc1, or Dpb4 proteins or reduce or prevent the normal biological activity of Isw2, Itc1, or Dpb4 proteins. In some embodiments, the present hybrid yeast cells include genetic manipulations that reduce or prevent the expression of a functional Dls1 protein, or reduce or prevent the normal biological activity of Dls1, while having no additional mutations that reduce or prevent the expression of a functional Isw2, Itc1, or Dpb4 proteins or reduce or prevent the normal biological activity of Isw2, Itc1, or Dpb4 proteins.

The amino acid sequence of the exemplified *S. cerevisiae* Dls1 polypeptide is shown, below, as SEQ ID NO: 1:

```
MNNETSGKET ASAPLCSPKL PVEKVQRIAK NDPEYMDTSD
DAFVATAFAT EFFVQVLTHE SLHRQQQQQQ QQVPPLPDEL
```

-continued

TLSYDDISAA IVHSSDGHLQ FLNDVIPTTK NLRLLVEENR

VRYTTSVMPP NEVYSAYVVN DTAPKPNIVE IDLDNDEDDD

EDVTDQE

Based on such BLAST and Clustal W data, it is apparent that the exemplified *S. cerevisiae* Dls1 polypeptide (SEQ ID NO: 1) share a very high degree of sequence identity to other known *S. cerevisiae* Dls1 polypeptides, as well as Dls1 polypeptides from other *Saccharomyces* spp. The present compositions and methods, are therefore, fully expected to be applicable to yeast cells containing such structurally similar polypeptides, as well as other related proteins, homologs, and functionally similar polypeptides.

In some embodiments of the present compositions and methods, the amino acid sequence of the Dls1 protein that is disrupted has an overall amino acid sequence identity to the amino acid sequence of at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, or even at least about 99% identity, to SEQ ID NO: 1

Preferably, disruption of the YJL065c gene is performed by genetic manipulation using sequence-specific molecular biology techniques, as opposed to chemical mutagenesis, which is generally not targeted to specific nucleic acid sequences. However, chemical mutagenesis is not excluded as a method for making modified yeast cells.

In some embodiments, the decrease in the amount of functional Dls1 polypeptide in the modified cells is a decrease of at least 30%, at least 40%, at least 50%, at least 60%, at least 70%, at least 80%, at least 90%, at least 95%, at least 98%, at least 99%, or more, compared to the amount of functional Dls1 polypeptide in parental hybrid cells growing under the same conditions. In some embodiments, the reduction of expression of functional Dls1 protein in the modified cells is a reduction of at least 30%, at least 40%, at least 50%, at least 60%, at least 70%, at least 80%, at least 90%, at least 95%, at least 98%, at least 99%, or more, compared to the amount of functional Dls1 polypeptide in parental hybrid cells growing under the same conditions.

In some embodiments, the additional increase in alcohol in the modified cells, compared to the parental hybrid cells, is an increase of at least 0.1%, at least 0.2%, at least 0.3%, at least 0.4%, at least 0.5%, 0.6%, at least 0.7%, at least 0.8%, at least 0.9%, at least 1.0%, or more, compared to the amount of functional Dls1 polypeptide in parental hybrid cells growing under the same conditions.

V. Hybrid Yeast Cells Including Additional Mutations that Affect Alcohol Production, Glycerol Production and/or Acetate Production In some embodiments, the present hybrid yeast cells, optionally in addition to having reduced expression of functional Dls1 polypeptides, further include additional modifications that affect alcohol, glycerol and/or acetate production.

In particular embodiments the hybrid yeast cells include an artificial or alternative pathway resulting from the introduction of a heterologous phosphoketolase gene and a heterologous phosphotransacetylase gene. An exemplary phosphoketolase can be obtained from *Gardnerella vaginalis* (UniProt/TrEMBL Accession No.: WP_016786789). An exemplary phosphotransacetylase can be obtained from *Lactobacillus plantarum* (UniProt/TrEMBL Accession No.: WP_003641060).

The hybrid yeast cells may further include mutations that result in attenuation of the native glycerol biosynthesis pathway, which are known to increase alcohol production. Methods for attenuation of the glycerol biosynthesis pathway in yeast are known and include reduction or elimination of endogenous NAD-dependent glycerol 3-phosphate dehydrogenase (GPD) or glycerol phosphate phosphatase activity (GPP), for example by disruption of one or more of the genes GPD1, GPD2, GPP1 and/or GPP2. See, e.g., U.S. Pat. No. 9,175,270 (Elke et al.), 8,795,998 (Pronk et al.) and 8,956,851 (Argyros et al.).

The hybrid yeast may further feature increased acetyl-CoA synthase (also referred to acetyl-CoA ligase) activity (EC 6.2.1.1) to scavenge (i.e., capture) acetate produced by chemical or enzymatic hydrolysis of acetyl-phosphate (or present in the culture medium of the yeast for any other reason) and converts it to Ac-COA. This avoids the undesirable effect of acetate on the growth of yeast cells and may further contribute to an improvement in alcohol yield. Increasing acetyl-CoA synthase activity may be accomplished by introducing a heterologous acetyl-CoA synthase gene into cells, increasing the expression of an endogenous acetyl-CoA synthase gene and the like. A particularly useful acetyl-CoA synthase for introduction into cells can be obtained from *Methanosaeta concilii* (UniProt/TrEMBL Accession No.: WP_013718460). Homologs of this enzymes, including enzymes having at least 85%, at least 90%, at least 92%, at least 95%, at least 97%, at least 98% and even at least 99% amino acid sequence identity to the aforementioned acetyl-CoA synthase from *Methanosaeta concilii*, are also useful in the present compositions and methods.

In some embodiments the hybrid yeast cells may further include a heterologous gene encoding a protein with $NAD^+$-dependent acetylating acetaldehyde dehydrogenase activity and/or a heterologous gene encoding a pyruvate-formate lyase. The introduction of such genes in combination with attenuation of the glycerol pathway is described, e.g., in U.S. Pat. No. 8,795,998 (Pronk et al.). However, in most embodiments of the present compositions and methods, the introduction of an acetylating acetaldehyde dehydrogenase and/or a pyruvate-formate lyase is not required because the need for these activities is obviated by the attenuation of the native biosynthetic pathway for making Ac-COA that contributes to redox cofactor imbalance. Accordingly, embodiments of the present compositions and methods expressly lack a heterologous gene(s) encoding an acetylating acetaldehyde dehydrogenase, a pyruvate-formate lyase or both.

In some embodiments, the present hybrid yeast cells further comprise a butanol biosynthetic pathway. In some embodiments, the butanol biosynthetic pathway is an isobutanol biosynthetic pathway. In some embodiments, the isobutanol biosynthetic pathway comprises a polynucleotide encoding a polypeptide that catalyzes a substrate to product conversion selected from the group consisting of: (a) pyruvate to acetolactate; (b) acetolactate to 2,3-dihydroxyisovalerate; (c) 2,3-dihydroxyisovalerate to 2-ketoisovalerate; (d) 2-ketoisovalerate to isobutyraldehyde; and (e) isobutyraldehyde to isobutanol. In some embodiments, the isobutanol biosynthetic pathway comprises polynucleotides encoding polypeptides having acetolactate synthase, keto acid reductoisomerase, dihydroxy acid dehydratase, ketoisovalerate decarboxylase, and alcohol dehydrogenase activity.

In some embodiments, the present hybrid yeast cells may further overexpress a sugar transporter-like (STL1) polypeptide to increase the uptake of glycerol (see, e.g., Ferreira et al. (2005) *Mol. Biol. Cell* 16:2068-76; Dušková et al. (2015) *Mol. Microbiol.* 97:541-59 and WO 2015023989 A1).

In some embodiments, the hybrid yeast cells comprising a butanol biosynthetic pathway further comprise a modification in a polynucleotide encoding a polypeptide having pyruvate decarboxylase activity. In some embodiments, the yeast cells comprise a deletion, mutation, and/or substitution in an endogenous polynucleotide encoding a polypeptide having pyruvate decarboxylase activity. In some embodiments, the polypeptide having pyruvate decarboxylase activity is selected from the group consisting of: PDC1, PDC5, PDC6, and combinations thereof. In some embodiments, the yeast cells further comprise a deletion, mutation, overexpression, and/or substitution in one or more endogenous polynucleotides encoding FRA2, ALD6, ADH1, GPD2, BDH1, DPB3, CPR1, MAL23C, MNN4, PAB1, TMN2, HAC1, PTC1, PTC2, OSM1, GIS1, CRZ1, HUG1, GDS1, CYB2P, SFC1, MVB12, LDB10, C5SD, GIC1, GIC2, TDA9 and/or YMR226C.

VI. Combination of Hybrid Yeast Cells with Other Beneficial Mutations

In some embodiments, the hybrid yeast cells, optionally in combination with other genetic modifications that benefit alcohol, glycerol or acetate production, further include any number of additional genes of interest encoding proteins of interest. Proteins of interest, include selectable markers, carbohydrate-processing enzymes, and other commercially-relevant polypeptides, including but not limited to an enzyme selected from the group consisting of a dehydrogenase, a transketolase, a phosphoketolase, a transladolase, an epimerase, a phytase, a xylanase, a β-glucanase, a phosphatase, a protease, an α-amylase, a β-amylase, a glucoamylase, a pullulanase, an isoamylase, a cellulase, a trehalase, a lipase, a pectinase, a polyesterase, a cutinase, an oxidase, a transferase, a reductase, a hemicellulase, a mannanase, an esterase, an isomerase, a pectinases, a lactase, a peroxidase and a laccase. Proteins of interest may be secreted, glycosylated, and otherwise-modified.

VII. Use of the Hybrid Yeast for Increased Alcohol Production

The present compositions and methods include methods for increasing alcohol production and/or reducing glycerol production, in fermentation reactions. Such methods are not limited to a particular fermentation process. The present engineered yeast is expected to be a "drop-in" replacement for convention yeast in any alcohol fermentation facility, whether using raw starch hydrolysis, simultaneous saccharification and fermentation, or other standard variations of conventional ethanol production. While primarily intended for fuel alcohol production, the present yeast can also be used for the production of potable alcohol, including wine and beer.

VIII. Yeast Cells Suitable for Hybridization and Further Modification

Yeasts are unicellular eukaryotic microorganisms classified as members of the fungus kingdom and include organisms from the phyla Ascomycota and Basidiomycota. Yeast that can be used for alcohol production include, but are not limited to, *Saccharomyces* spp., including *S. cerevisiae*, as well as *Kluyveromyces*, Lachancea and *Schizosaccharomyces* spp. Numerous yeast strains are commercially available, many of which have been selected or genetically engineered for desired characteristics, such as high alcohol production, rapid growth rate, and the like. Some yeasts have been genetically engineered to produce heterologous enzymes, such as glucoamylase or α-amylase.

IX. Substrates and Products

Alcohol production from a number of carbohydrate substrates, including but not limited to corn starch, sugar cane, cassava, and molasses, is well known, as are innumerable variations and improvements to enzymatic and chemical conditions and mechanical processes. The present compositions and methods are believed to be fully compatible with such substrates and conditions.

Alcohol fermentation products include organic compound having a hydroxyl functional group (—OH) is bound to a carbon atom. Exemplary alcohols include but are not limited to methanol, ethanol, n-propanol, isopropanol, n-butanol, isobutanol, n-pentanol, 2-pentanol, isopentanol, and higher alcohols. The most commonly made fuel alcohols are ethanol, and butanol.

These and other aspects and embodiments of the present yeast strains and methods will be apparent to the skilled person in view of the present description. The following examples are intended to further illustrate, but not limit, the compositions and methods.

Examples

Example 1. Construction of strain DGY1

*Saccharomyces cerevisiae* strain DGY1 (abbreviated DGY1) is a hybrid yeast strain constructed by mating haploid strains derived from two commercially-available industrial grain ethanol production strains, herein designated Strain A and Strain B. Strains A and B were sporulated, and haploid segregants were isolated. One segregant from each strain was mated to generate hybrid strain DGY1, which is deposited under Accession No. V18/015412 at the National Measurement Institute in Victoria, Australia and has the Brazilian SISGEN Registry No. A9D1003.

Example 2. Ethanol Production by Strain DGY1 at Different Temperatures

The new yeast strain DGY1 was tested for its ability to produce ethanol compared to the benchmark yeast FERMAX™ Gold (Martrex, Inc., Chaska, MN, USA; hereafter abbreviated, FG), a well-known commercial strain used for alcohol production, in liquefact at different temperatures. Liquefact (ground corn slurry having a dry solids content of 35%) was prepared by adding 600 ppm urea, 0.124 SAPU/g ds FERMGEN™ 2.5× (acid fungal protease), 0.33 GAU/g ds variant *Trichoderma* glucoamylase (TrGA), 2.28 SSCU/g ds *Aspergillus* α-amylase (AcAA), 0.078 THU/g ds OPTIMASH® Trehalase and 0.113 FTU/g ds OPTIMASH® Phytase, adjusted to a pH of 4.8. 100 g of liquefact was weighed into 250 ml vessels and inoculated with fresh overnight cultures of the DGY1 or FG and incubated for 66 h at 32° C., 34° C., 37° C. or the temperature ramp conditions shown in Table 1. A gas monitoring system (ANKOM Technology) was used to record the rate of fermentation based on cumulative pressure following $CO_2$ production over time.

Samples were harvested by centrifugation, filtered through 0.2 μm filters, and analyzed for ethanol, glucose, acetate and glycerol content by HPLC (Agilent Technologies 1200 series) using a Phenomenex Rezex-RFQ Fast Fruit column with an isocratic flow rate of 1 ml/min in 0.01 N $H_2SO_4$ eluent. Calibration standards used for quantification included known amounts of ethanol, glucose, glycerol and acetate. The results of the analyses are shown in Table 2. Ethanol increase is reported with reference to FG.

TABLE 1

Temperature ramp condition

| Time (hr) | Temperature (° C.) |
|---|---|
| 0-10 | 32.0 |
| 10-12 | 33.0 |
| 12-15 | 34.0 |
| 15-17 | 35.0 |
| 17-22 | 35.5 |
| 22-27 | 34.5 |
| 27-31 | 34.0 |
| 31-36 | 33.5 |
| 36-41 | 33.0 |
| 41-55 | 32.5 |
| 55-end | 32.0 |

TABLE 2

Performance of FG and DGY1 at different temperatures

| Strain | Temperature (° C.) | Glucose (g/L) | Glycerol (g/L) | Acetate (g/L) | Ethanol (g/L) | Ethanol increase (%) |
|---|---|---|---|---|---|---|
| FG | 32 | 1.0 | 15.4 | 0.9 | 142.9 | — |
| DGY1 | 32 | 0.4 | 14.5 | 1.0 | 145.9 | 2.1 |
| FG | 34 | 11.8 | 15.9 | 1.2 | 137.1 | — |
| DGY1 | 34 | 3.1 | 14.9 | 1.0 | 142.2 | 3.7 |
| FG | 37 | 66.8 | 14.8 | 1.7 | 112.6 | — |
| DGY1 | 37 | 61.3 | 14.5 | 1.7 | 115.6 | 2.7 |
| FG | ramp | 14.4 | 16.0 | 1.1 | 136.1 | — |
| DGY1 | ramp | 0.8 | 15.0 | 1.0 | 143.5 | 5.4 |

The new strain, DGY1, produced significantly more ethanol, i.e., about 2 to over 5%, compared to FG, particularly at elevated temperatures. DGY1 also produced less glycerol compared to FG.

Example 3. Construction of DGY1 with the Deletion of YJL065c

DGY1 was further modified by deletion of the YJL065c gene (which encodes Dls1), resulting in strain DGY1-A. The amino acid sequence of Dls1 is provided below as SEQ ID NO: 1.

```
MNNETSGKET ASAPLCSPKL PVEKVQRIAK NDPEYMDTSD

DAFVATAFAT EFFVQVLTHE SLHRQQQQQQ QQVPPLPDEL

TLSYDDISAA IVHSSDGHLQ FLNDVIPTTK NLRLLVEENR

VRYTTSVMPP NEVYSAYVVN DTAPKPNIVE IDLDNDEDDD

EDVTDQE
```

Using standard yeast molecular biology techniques, the YJL065c gene was disrupted by deleting essentially the entire coding sequence for Dls1, i.e., by deleting the nucleic acid sequence from 4 base-pairs before the start codon to 10 base-pairs before the stop codon in both alleles of S. cerevisiae. All procedures were based on the publicly available nucleic acid sequence of YJL065c, which is provided below as SEQ ID NO: 2:

```
ATGAACAACGAGACTAGTGGTAAAGAAACGGCGTCTGCACCTCTGTGTT

CGCCCAAGTTACCTGTAGAAAAAGTGCAGAGAATAGCCAAGAATGATCC

AGAATATATGGACACTTCGGATGACGCATTCGTAGCCACAGCGTTTGCT

ACAGAATTCTTCGTCCAGGTGCTGACACATGAGTCCCTACATAGGCAAC

AGCAGCAGCAACAACAACAGGTACCGCCGCTCCCAGATGAACTCACGCT

GTCGTACGATGACATCTCTGCCGCAATTGTGCACTCTTCTGACGGCCAT

CTGCAGTTTTTGAATGATGTGATACCAACAACAAAGAATTTGAGGCTTC

TAGTGGAAGAAAACCGAGTTAGATATACTACAAGTGTCATGCCCCCTAA

TGAAGTTTACTCCGCCTATGTGGTGAACGATACGGCTCCGAAGCCCAAC

ATTGTCGAGATTGATCTTGATAATGACGAAGACGACGACGAAGACGTTA

CTGATCAAGAATAA
```

Deletion of the YJL065c gene in DGY1 was confirmed by colony PCR. The modified yeast was grown in non-selective media to remove the plasmid conferring Kanamycin resistance used to select transformants, resulting in modified yeast that required no growth supplements compared to the parental yeast. The resulting strain (DGY1 with the YJL065c gene deleted) was designated DGY1-A.

Example 4. Ethanol Production by DGY1 and DGY1-A

The new yeast strains DGY1 and DGY1-A, along with the parental yeast strains (referred to as Stain A and Strain B), were tested for their ability to produce ethanol in shake flask fermentations at 32° C. or 35° C. Liquefact (i.e., corn flour slurry having a dry solid (ds) value of 34% was prepared by adding 600 ppm urea, 0.124 SAPU/g ds FERMGEN™ 2.5× (an acid fungal protease), 0.33 GAU/g ds variant Trichoderma reesei glucoamylase and 2.28 SSCU/g ds Aspergillus α-amylase (AcAA) at pH 4.8. 50 g of liquefact was weighed into 125 ml conical flasks and inoculated with fresh overnight yeast culture for a final $OD_{600}$ of 0.3. The flasks were incubated for 65 h at 32° C. or 35° C. with shaking (200 rpm). Samples from shake flask fermentations were harvested by centrifugation, filtered through 0.2 μm filters, and analyzed for ethanol, glucose, acetate and glycerol content by HPLC (Waters e2695 series) using Bio-Rad Aminex HPX-87H columns at 65° C., with an isocratic flow rate of 0.6 ml/min in 0.01 N $H_2SO_4$ eluent. Calibration standards were used for quantification of the of acetate, ethanol, glycerol, and glucose. The results for the fermentations at 35° C. are shown in Table 3.

TABLE 3

Analysis of fermentation broth following fermentation with Strains A and B, DGY1 and DGY1-Δ in liquefact at 35° C.

| Strain | Glucose (g/L) | Glycerol (g/L) | Acetate (g/L) | Ethanol (g/L) | Ethanol increase over Strain A (%) | Ethanol increase over Strain B (%) |
|---|---|---|---|---|---|---|
| Strain A | 2.44 | 13.17 | 0.94 | 133.19 | — | (−2.1) |
| Strain B | 2.07 | 11.01 | 0.83 | 136.06 | 2.2 | — |
| DGY1 | 1.92 | 12.13 | 0.99 | 139.56 | 4.8 | 2.6 |
| DGY1-Δ | 1.74 | 12.43 | 1.17 | 140.66 | 5.6 | 3.4 |

At 35° C., DGY1 produced significantly more ethanol compared to the parental yeast strains (i.e., 4.8% more ethanol than Strain A and 2.6% more ethanol than Strain B). DGY1-A produced even more ethanol than DGY1, i.e. 5.6% more ethanol than Strain A and 3.4% more ethanol than Strain B. This indicates that the YJL065c deletion confers an improvement in ethanol production in the DGY1 hybrid strain background. At 32° C., ethanol production by DGY1 and DGY1-A was similar to that produced by Strain A and B (data not shown).

Example 5. Expression of Glucoamylase in DGY1 and DGY1-A

DGY1 and DGY1-A were each further modified to express one of two different glucoamylases, herein designated $G_1$ and $G_2$, by transformation with DNA cassettes containing a codon-optimized GA gene fused to the *S. cerevisiae* FBA1 promoter and FBA1 terminator. Reference strains were constructed by transforming the same GA expression cassettes into Strain A or Strain A with a YJL065c deletion (i.e., Strain A-A). Integration of the GA expression cassettes was confirmed by colony PCR. The modified yeast was grown in non-selective media to remove the plasmid conferring antibiotic resistance used to select transformants, resulting in modified yeast that required no growth supplements compared to the parental yeast. Transformants in which the GA expression cassette was integrated were identified and designated as indicated in Table 4.

TABLE 4

Designations of glucoamylase expressing strains

| Strain | GA expressed | Background |
|---|---|---|
| Strain A-$G_1$ | $G_1$ | Strain A |
| DGY1-$G_1$ | $G_1$ | DGY1 |
| Strain A-Δ-$G_2$ | $G_2$ | Strain A-Δ (i.e., Strain A ΔYJL065c) |
| DGY1-Δ-$G_2$ | $G_2$ | DGY1-Δ (i.e., DGY1 ΔYJL065c) |

Example 6. Ethanol Production by Hybrid Yeast Expressing Glucoamylase in Liquefact The new hybrid yeast strains expressing glucoamylase were tested for their ability to produce ethanol in liquefact, as compared to the equivalent reference strains containing the same modifications but in the Strain A background (i.e., DGY1-$G_1$ was compared to the reference strain Strain A-$G_1$, and DGY1-Δ-$G_2$ was compared to the reference strain Strain A-Δ-$G_2$). Liquefact (i.e., corn flour slurry having a dry solid (ds) value of 34% was prepared by adding 600 ppm urea, 0.124 SAPU/g ds FERMGEN™ 2.5× (an acid fungal protease), 0.11 GAU/g ds variant *Trichoderma reesei* glucoamylase and 2.28 SSCU/g ds *Aspergillus* α-amylase (AcAA) at pH 4.8. 50 g of liquefact was weighed into 125 ml conical flasks and inoculated with fresh overnight yeast culture for a final $OD_{600}$ of 0.3. The flasks were incubated for 65 h at 32° C. or 35° C. with shaking (200 rpm). Samples from shake flask fermentations were harvested by centrifugation, filtered through 0.2 μm filters, and analyzed for ethanol, glucose, acetate and glycerol content by HPLC (Waters e2695 series) using Bio-Rad Aminex HPX-87H columns at 65° C., with an isocratic flow rate of 0.6 ml/min in 0.01 N $H_2SO_4$ eluent. Calibration standards were used for quantification of the of acetate, ethanol, glycerol, and glucose. The results for the fermentations at 35° C. are shown in Table 5. Ethanol increase is reported relative to the FG-based strain expressing the same GA (i.e., DGY1-$G_1$ is compared to Strain Δ-$G_1$, and DGY1-Δ-$G_2$ is compared to Strain A-Δ-$G_2$).

TABLE 5

Analysis of fermentation broth following fermentation with GA-expressing Strain A and DGY1 yeast in liquefact at 35° C.

| Strain | Background | GA | Glucose (g/L) | Glycerol (g/L) | Acetate (g/L) | Ethanol (g/L) | Ethanol increase (%) |
|---|---|---|---|---|---|---|---|
| Strain A-$G_1$ | Strain A | $G_1$ | 37.69 | 11.50 | 0.51 | 127.7 | — |
| DGY1-$G_1$ | DGY1 | $G_1$ | 14.94 | 11.01 | 0.76 | 138.4 | 8.4 |
| Strain A-Δ-$G_2$ | Strain A-Δ | $G_2$ | 23.76 | 11.39 | 0.57 | 134.36 | — |
| DGY1-Δ-$G_2$ | DGY1-Δ | $G_2$ | 1.61 | 11.32 | 0.88 | 137.23 | 2.1 |

DGY1-G$_1$ produced significantly more ethanol compared to the equivalent Strain Δ-G$_1$ at 35° C. (i.e., 8.4% more ethanol than Strain Δ-G$_1$). DGY1-Δ-G$_2$ produced significantly more ethanol compared to the equivalent Strain A-Δ-G$_2$ (i.e., 2.1% more ethanol than Strain A-A-G$_2$). At 32° C., ethanol production by DGY1-G$_1$ was similar to Strain Δ-G$_1$, and ethanol production by DGY1-Δ-G$_2$ was similar to Strain A-Δ-G$_2$ (data not shown).

What is claimed is:

1. A yeast strain that is *Saccharomyces cerevisiae* strain DGY1 deposited under Accession No. V18/015412 at National Measurement Institute, Victoria, Australia.

2. The yeast strain of claim 1, further comprising a genetic alteration that causes the cells of the yeast strain to produce a decreased amount of functional Dpb3-like subunit (Dls1) polypeptide.

3. The yeast strain of claim 1, wherein the cells of the yeast strain further comprise an exogenous gene encoding a carbohydrate processing enzyme.

4. The yeast strain of claim 3, wherein the exogenous gene encoding a carbohydrate processing enzyme encodes a glucoamylase.

5. The yeast strain of claim 1, wherein the cells of the yeast strain further comprise an alteration in the glycerol pathway and/or the acetyl-CoA pathway.

6. The yeast strain of claim 1, wherein the cells of the yeast strain further comprise an alternative pathway for making ethanol.

7. A process for producing ethanol from a starch-containing material comprising:
   (a) saccharifying the starch-containing material to obtain glucose; and
   (b) fermenting the glucose to produce ethanol using a fermentation organism;
   wherein the fermentation organism is the *Saccharomyces cerevisiae* strain DGY1 deposited under Accession No. V18/015412 at National Measurement Institute, Victoria, Australia.

8. The process of claim 7, wherein the cells of the yeast strain further comprise a genetic alteration that causes the cells of the strain to produce a decreased amount of functional Dls1 polypeptide.

9. The process of claim 7, wherein the cells of the yeast strain further comprise an exogenous gene encoding a carbohydrate processing enzyme.

10. The process of claim 9, wherein the exogenous gene encoding a carbohydrate processing enzyme encodes a glucoamylase.

11. The process of claim 7, wherein the cells of the yeast strain further comprise an alteration in the glycerol pathway and/or the acetyl-CoA pathway.

12. The process of claim 7, wherein the cells of the yeast strain further comprise an alternative pathway for making ethanol.

* * * * *